United States Patent [19]

Kelly

[11] Patent Number: 4,891,474
[45] Date of Patent: Jan. 2, 1990

[54] SPARKING STYLUS FOR ACOUSTIC DIGITIZER

[75] Inventor: William Kelly, Seymour, Conn.

[73] Assignee: Science Accessories Corp., Stratford, Conn.

[21] Appl. No.: 314,562

[22] Filed: Feb. 23, 1989

[51] Int. Cl.⁴ .............................................. G08C 21/00
[52] U.S. Cl. ........................................ 178/18; 181/0.5
[58] Field of Search .................... 178/18, 19; 367/907, 367/147; 181/118, 0.5

[56] References Cited

U.S. PATENT DOCUMENTS 3,626,483 12/1971 Whetstone et al. .............. 178/18 X Primary Examiner—Stafford D. Schreyer
Attorney, Agent, or Firm—Martin M. Novack

[57] ABSTRACT

An improved stylus is disclosed for generating acoustic wave energy for use in an acoustic digitizer system wherein an operator-designated stylus position is determined from measurements performed on acoustic energy generated at the stylus. A stylus body is provided and has a generally elongated shape. A tip member extends from the front of the stylus body, the tip member preferably being elongated and narrowing to a point at its front end. A pair of spaced conductive wires are disposed in said tip member, the wires preferably being substantially parallel and having their front ends terminating forwardly in the tip member. The wires extend rearwardly in the tip member, and means are provided for coupling the wires to a source of electrical potential. In the preferred embodiment, the tip member is tubular, and the front ends of the wire pair terminate in the tubular bore of the tip member at a position where the tip member begins to narrow to a point. The wire ends are substantially parallel and substantially symmetric about the axis of the tip member. A plurality of apertures are provided in the narrowing portion of the tip member, these apertures permitting efficient emission of acoustic energy from the spark gap at the wire ends. By having the spark gap substantially centrally within the tip member and close to the stylus point that contacts the working surface, the errors and inconsistencies that can result from different rotational orientations and/or tilts of the stylus are minimized.

20 Claims, 2 Drawing Sheets

SPARKING STYLUS FOR ACOUSTIC DIGITIZER

BACKGROUND OF THE INVENTION

This invention relates to generation of fast rise time acoustic waves and, more particularly, to an improved stylus for generation of fast rise time acoustic wave energy for use in position determining equipment.

Systems known as "acoustic digitizers" determine the position of a movable indicator by determining the travel time of sound between the indicator and known positions. In many acoustic digitizer applications, a hand-held stylus is utilized, much as a writing pen, to point to a particular position in a working area. The stylus tip is connected to a microswitch which is, in turn, coupled to circuitry that electrically generates a spark at or near the stylus tip. This results in shock wave acoustic energy which radiates from the region of the tip. Clocks are started in synchronism with the generation of the spark. When acoustic energy arrives at known locations (typically two or more spaced apart microphones), the clocks are respectively stopped and the times of propagation of the acoustic energy from the stylus tip to the microphones are used to automatically calculate the positional coordinates of the stylus tip, based on trigonometric relationships and the speed of sound in air.

An example of a prior art type of stylus for use in an acoustic digitizer is illustrated in U.S. Pat. No. 3,626,483. As described in that patent, a tubular housing contains a conductive ink cartridge having a ball point for writing. A microswitch is mounted at the rear of the ink cartridge. A wire runs through a passageway in the housing and terminates at a tungsten whisker that forms a spark gap with the tip of the cartridge. The microswitch controls application of a potential across the spark gap. A notched barium titanate collar is provided around the tip of the cartridge. The notched collar is used to obtain consistency in the direction of the spark.

Another prior art spark pen configuration utilizes a pair of parallel wires in a insulated ceramic carrier, the tips of the wires protruding from the ceramic to form a spark gap that is near the tip of the stylus. Application of a suitable potential across the wire pair generates a spark near the stylus tip.

The above-described types of sparkling styluses could stand improvement in the accuracy and consistency of the digitizer measurements produced by systems that employ such styluses. The exact position of the spark gap will affect the time of propagation of the acoustic energy to the system microphones. However, due to the nature of construction of the stylus tip and spark gap, the spark gap can be at different positions, depending upon the rotational orientation and the tilt of the stylus, even when the stylus point is at the same fixed position. Consider, for example, the above described sparking pen of U.S. Pat. No. 3,626,483. For a given position of the ink cartridge tip, the conductive whisker can be at any rotational orientation with respect to the cartridge axis, and the exact location of the spark will be determined by said rotational orientation. Some degree of consistency of measurement can be achieved by having the user always have the sparking pen at approximately the same rotational orientation, such as by providing an indicating dot on the spark pen or by having the user always have the whisker point in the same direction. In addition to being inconvenient, this expedient also leaves room for substantial error.

The same drawbacks will be present in a sparking stylus that uses a wire pair with a spark gap on the side of the ink cartridge or other stylus.

Another source of possible inconsistency or error in the prior art sparking styluses can arise from different tilt angles of the stylus. Since the spark gap is at a significantly higher elevation than the stylus tip which contacts the working surface, a change in the degree of tilt of the stylus will change the effective spark position. Again, it is possible to somewhat control this inconsistency or error by having the user always employ approximately the same stylus tilt but, as above noted, this tends to be inconvenient and leaves room for error.

It is an object of the present invention to provide an improved sparking stylus that substantially overcomes the types of problems described above, and permits more convenient, more consistent, and more accurate operation of acoustic digitizer systems.

SUMMARY OF THE INVENTION

The present invention is directed to an improved stylus for generating acoustic wave energy for use in an acoustic digitizer system wherein an operator-designated stylus position is determined from measurements performed on acoustic energy generated at the stylus. A stylus body is provided and has a generally elongated shape. A tip member extends from the front of the stylus body, the tip member preferably being elongated and narrowing to a point at its front end. A pair of spaced conductive wires are disposed in the tip member, the wires preferably being substantially parallel and having their front ends terminating forwardly in the tip member. The wires extend rearwardly in the tip member, and means are provided for coupling the wires to a source of electrical potential.

In the preferred embodiment of the invention, the tip member is tubular, and the front ends of the wire pair terminate in the tubular bore of the tip member at a position where the tip member begins to narrow to a point. In this embodiment, the wire ends are substantially parallel and substantially symmetric about the axis of the tip member. A plurality of apertures are provided in the narrowing portion of the tip member, these apertures permitting efficient emission of acoustic energy from the spark gap at the wire ends.

By having the spark gap substantially centrally within the tip member and close to the stylus point that contacts the working surface, the errors and inconsistencies that can result from different rotational orientations and/or tilts of the stylus are minimized. The provision of a hollow tip member and a wire pair frontwardly and axially symmetric in the hollow bore in the tip member, helps to achieve this end.

Further features and advantages of the invention will become more readily apparent from the following detailed description when taken in conjunction with the accompanying drawings.

DESCRIPTION OF THE PREFERRED EMBODIMENT

Figure 1:
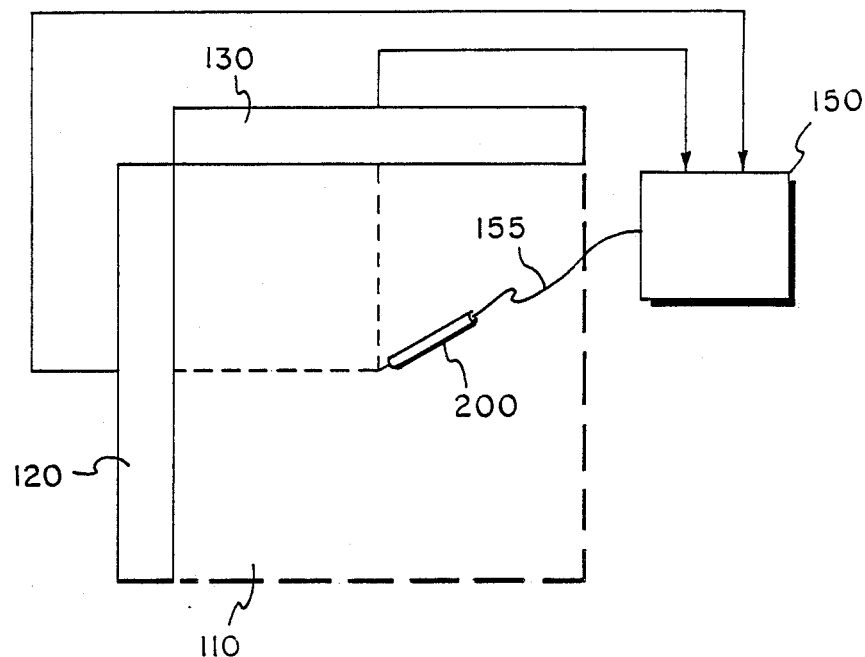
FIG. 1 is a block diagram of an example of an acoustic digitizer system in which the improvement of the present invention can be utilized.

Referring to FIG. 1, there is shown a block diagram of an example of a type of digitizer system in which the improved stylus of the present invention can be employed. Examples of acoustic digitizer systems are disclosed in U.S. Pat. Nos. 3,838,212 and 4,012,588, and reference can be made to these and other existing descriptions of such systems, the present brief description being for the purpose of facilitating understanding the type of system in which the invention can be utilized. A working area, which is typically a flat surface on which can be placed a diagram, transparency, etc. (not shown), on which positions or dimensions are to be designated, determined, or calculated, is labeled with reference numeral 110. A hand-held stylus 200, is utilized by an operator to designate positions in the working area. A pair of elongated microphones 120 and 130 are positioned along adjacent edges of the working area. Acoustic wave energy generated near the tip of stylus 200, such as by electrically generating a spark, is received at the microphones 120 and 130. Electronic circuitry in a console 150 provides energizing signals for the spark via cable 155, and includes clocking circuitry for determining the time the acoustic wave energy takes to travel from the stylus to each of the microphones 120 and 130. The travel times are representative of the operator-designated stylus position. In this illustrated example, elongated microphones are shown, but other configurations, such as point microphones, can be utilized.

Figure 2:
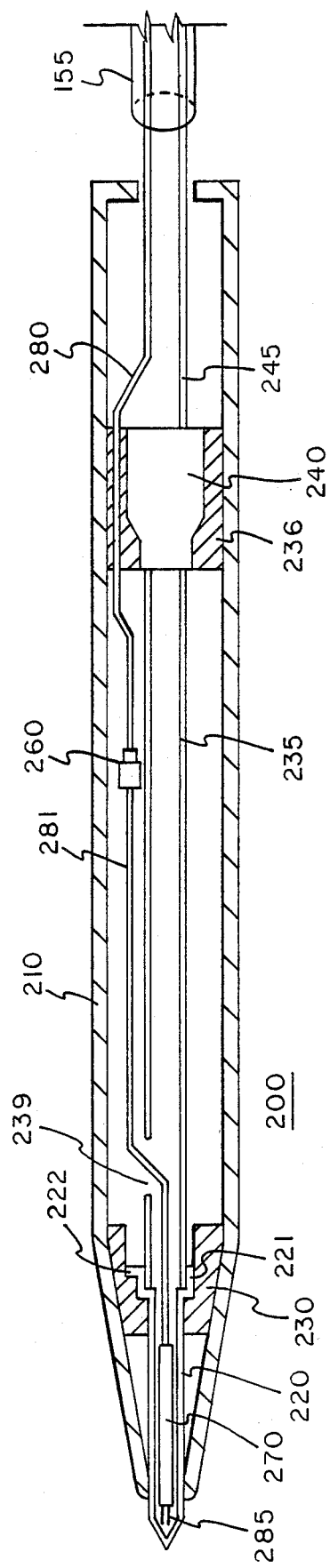
FIG. 2 is a cross-sectional view of a sparking stylus in accordance with an embodiment of the invention.

Referring to FIG. 2, there is shown a diagram of a sparking stylus 200 in accordance with an embodiment of the invention. A generally tubular stylus body 210 is provided It will be understood that the stylus can contain a portion of the spark energizing circuit, if desired. In the present embodiment, however, the stylus contains a microswitch 240 used for control purposes, and the other circuitry associated with generating the energizing signal for the spark is located remotely to the stylus, e.g. in console 150 (FIG. 1). The energizing signal is carried by a wire pair within the cable 155 that is coupled between the stylus and console 150. The circuitry for generation of the energizing signal is known in the art and is not, of itself, an inventive aspect hereof. Reference can be made, for example, to the abovereferenced U.S. Pat. No. 3,838,212 and to various descriptions of known pulser circuits.

Figure 3:
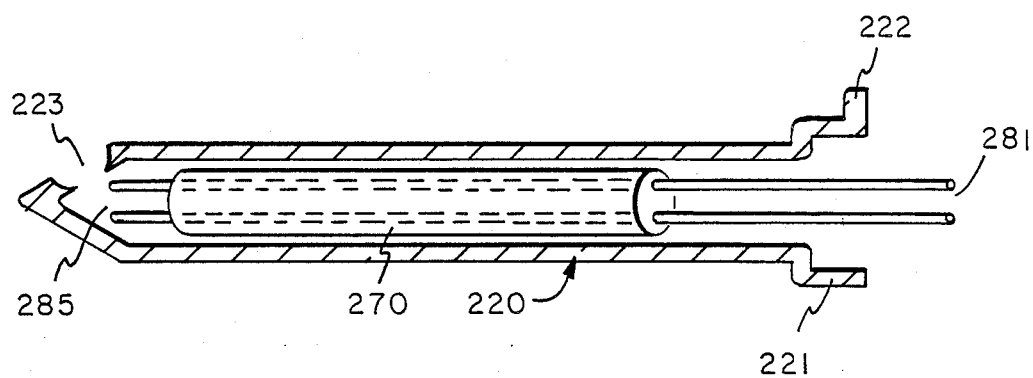
FIG. 3 is a cross-sectional view of the tip member of the FIG. 2 embodiment.

A stylus tip member 220, also shown in FIG. 3, is mounted at the front end of the stylus body, and protrudes therefrom. If desired, the stylus tip member can be integral with the stylus body, although this may be less convenient from a construction standpoint. The tip member, which may be formed of a rigid plastic, has an elongated generally cylindrical tubular shape and narrows at its front end to form a point. As used herein, the term "point" is intended in a generic sense to mean the narrowed end of the tip member that will contact the working surface or the media thereon. In the diagrams of FIGS. 2 and 3 the point is a rounded nose cone, the degree of sharpness of the point being a matter of design choice. The tip member 220 has an annular rim 221 at its rear end. The tip member is slidably mounted in an annular support 230, also of rigid plastic, that is press fit in the stylus body 210. The tip member has a tab 222 that engages a slot in support 230 and prevents rotation of the tip member 220. The annular rim receives the front end of a tubular extension post 235, also of rigid plastic. The rear end of post 235 is connected to a microswitch 240 that is mounted rearwardly in the body 210 in a mounting ring 236. A spring in the microswitch (not shown) biases the post 235 and tip member 220 in the frontward direction. When the operator presses down on the stylus, the tip member 220 and post 235 will move rearwardly and close the microswitch 240. A wire pair 245 runs through cable 155 to the console 150 so that the state of microswitch 24U can be used to control when sparks are to be generated.

The insulated wire pair 280 carrying the spark energizing potential is also carried by cable 155 and enters the stylus body 210 through an aperture at its back end. The wire pair 280 passes through and is secured by the plastic mounting ring 236 in which the microswitch 240 is mounted. The wire pair 280 is then coupled, via a connector 260, to an insulated wire pair segment 281 that passes through a slot 239 in the extension post 235 and then into the bore of tip member 220. The front portions of the wires of wire pair segment 281 then pass to an elongated ceramic insulator 270 and are imbedded therein (as shown in dashed line at 281A and 281B in FIG. 3). The ceramic insulator is disposed in the tip member 220, and the ends of the wire pair imbedded therein protrude from the front of the insulator 270 and form spark gap 285 (FIG. 3). In the illustrated embodiment the wire ends extend into the narrowing portion of the tip member bore. The wire ends are substantially symmetrical about the axis of the tip member 220. As seen in FIG. 3, a plurality (e.g. four) of apertures 223 are provided in the narrowing or tapered region of the tip member to permit efficient emission of the acoustic energy resulting from the sparks generated at the sPark gap 285.

By having the spark gap substantially centrally within the tip member and close to the stylus point that contacts the working surface, the errors and inconsistencies that can result from different rotational orientations and/or tilts of the stylus are minimized. The provision of a hollow tip member and a wire pair frontwardly and axially symmetric in the hollow bore in the tip member, helPs to achieve this end.

I claim:

1. For use in an acoustic digitizer system wherein an operator-designated stylus position is determined from measurements performed on acoustic energy generated at a stylus, an improved stylus, comprising:
   a stylus body having a generally elongated shape;
   a tip member which extends from the front of said stylus body, said tip member narrowing to a point at its front end;
   a pair of spaced conductive wires disposed in said tip member with their front ends terminating forwardly in said tip member, said wires extending rearwardly in said tip member; and
   means for coupling said wires to a source of electrical potential.

2. The stylus as defined by claim 1, wherein said tip member is elongated and tubular, and wherein said front ends of the wire pair terminate in the tubular bore of said tip member at a position where said tip member begins to narrow to a point.

3. The stylus as defined by claim 1, wherein said tip member is elongated and said wire ends are substantially parallel and substantially symmetric about the axis of said tip member.

4. The stylus as defined by claim 2, wherein said tip member is elongated and said wire ends are substantially parallel and substantially symmetric about the axis of said tip member.

5. The stylus as defined by claim 1, wherein there is an air gap between said wire front ends.

6. The stylus as defined by claim 4, wherein there is an air gap between said wire front ends.

7. The stylus as defined by claim 1, wherein said tip member is elongated and said wire ends are extensions of wires contained in an insulator disposed within said tip member.

8. The stylus as defined by claim 4, wherein said wire ends are extensions of wires contained in an insulator disposed within said tip member.

9. The stylus as defined by claim 1, wherein said tip member has a plurality of apertures in the narrowing portion thereof.

10. The stylus as defined by claim 4, wherein said tip member has a plurality of apertures in the narrowing portion thereof.

11. The stylus as defined by claim 5, wherein said tip member has a plurality of apertures in the narrowing portion thereof.

12. The stylus as defined by claim 7, wherein said tip member has a plurality of apertures in the narrowing portion thereof.

13. The stylus as defined by claim 1, wherein said tip member is formed of plastic.

14. The stylus as defined by claim 4, wherein said tip member is formed of plastic.

15. The stylus as defined by claim 9, wherein said tip member is formed of plastic.

16. The stylus as defined by claim 1, wherein said stylus contains a switch, and wherein said tip member is mechanically coupled with said switch, and further comprising means for coupling said switch to said source of electrical potential for controlling application of said source of electrical potential to said wire pair.

17. The stylus as defined by claim 4, wherein said stylus contains a switch, and wherein said tip member is mechanically coupled with said switch, and further comprising means for coupling said switch to said source of electrical potential for controlling application of said source of electrical potential to said wire pair.

18. The stylus as defined by claim 7, wherein said insulator in said tip member comprises a ceramic insulator.

19. The stylus as defined by claim 8, wherein said insulator in said tip member comprises a ceramic insulator.

20. The stylus as defined by claim 12, wherein said insulator in said tip member comprises a ceramic insulator.

* * * * *